US009306707B2

(12) United States Patent
Kim et al.

(10) Patent No.: US 9,306,707 B2
(45) Date of Patent: Apr. 5, 2016

(54) METHOD AND APPARATUS FOR PROCESSING CONTROL INFORMATION INCLUDED IN DATA UNIT IN A MOBILE COMMUNICATION SYSTEM

(75) Inventors: Soeng-Hun Kim, Suwon-si (KR); Gert Jan Van Lieshout, Middlesex (GB); Kyeong-In Jeong, Hwaseong-si (KR); Himke Van Der Velde, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 1120 days.

(21) Appl. No.: 11/951,756

(22) Filed: Dec. 6, 2007

(65) Prior Publication Data
US 2008/0146214 A1 Jun. 19, 2008

(30) Foreign Application Priority Data

Dec. 6, 2006 (KR) .................. 10-2006-0123051
Jul. 23, 2007 (KR) .................. 10-2007-0073451

(51) Int. Cl.
*H04W 4/00* (2009.01)
*H04L 1/16* (2006.01)

(52) U.S. Cl.
CPC .................... *H04L 1/1685* (2013.01)

(58) Field of Classification Search
USPC ............. 370/394, 326, 257, 280; 375/295; 455/422.1, 436, 434, 3.02, 419, 118, 455/438, 466, 556.1
See application file for complete search history.

(56) References Cited

U.S. PATENT DOCUMENTS

| 7,852,790 | B2* | 12/2010 | Furuishi et al. | 370/257 |
| 2004/0249955 | A1* | 12/2004 | Wuerful | 709/227 |
| 2005/0287957 | A1 | 12/2005 | Lee et al. | |
| 2006/0062323 | A1* | 3/2006 | Yi et al. | 375/295 |
| 2006/0251105 | A1 | 11/2006 | Kim et al. | |
| 2006/0282506 | A1* | 12/2006 | Furuishi et al. | 709/208 |
| 2007/0002050 | A1* | 1/2007 | Aoki et al. | 345/428 |
| 2007/0008990 | A1* | 1/2007 | Torsner | 370/473 |
| 2008/0025314 | A1* | 1/2008 | Lee et al. | 370/394 |
| 2009/0185535 | A1* | 7/2009 | Lee et al. | 370/331 |
| 2014/0006892 | A1* | 1/2014 | Torsner et al. | 714/748 |

FOREIGN PATENT DOCUMENTS

| EP | 1 641 190 A1 * | 9/2004 | ........... H04L 12/56 |
| EP | 1 638 237 | 3/2006 | |
| EP | 1 641 190 | 3/2006 | |
| EP | 1 689 134 | 8/2006 | |
| WO | WO 02/096044 | 11/2002 | |
| WO | WO 03/047206 | 6/2003 | |
| WO | WO 2005/122441 | 12/2005 | |
| WO | WO 2005/125125 | 12/2005 | |
| WO | WO 2006/052085 | 5/2006 | |

* cited by examiner

*Primary Examiner* — Joseph Arevalo
(74) *Attorney, Agent, or Firm* — The Farrell Law Firm, P.C.

(57) ABSTRACT

A method and apparatus for processing control information included in a data unit in a mobile communication system are provided. A receiver processes control information of a first type immediately irrespective of reordering of a received data unit, when the received data unit comprises the control information of the first type. The receiver processes control information of a second type after reordering of the received data unit, when the received data unit comprises the control information of the second type.

11 Claims, 11 Drawing Sheets

METHOD AND APPARATUS FOR PROCESSING CONTROL INFORMATION INCLUDED IN DATA UNIT IN A MOBILE COMMUNICATION SYSTEM

PRIORITY

This application claims priority under 35 U.S.C. §119(a) to a Korean Patent Application filed in the Korean Intellectual Property Office on Dec. 6, 2006 and assigned Serial No. 2006-123051, and a Korean Patent Application filed in the Korean Intellectual Property Office on Jul. 23, 2007 and assigned Serial No. 2007-73451, the disclosures of which are incorporated herein by reference.

BACKGROUND OF THE INVENTION

1. Field of the Invention

The present invention generally relates to a mobile communication system, and more particularly, to a method and apparatus for efficiently processing Layer 2 (L2) control information included in a data unit.

2. Description of the Related Art

Universal Mobile Telecommunications System (UMTS) is a $3^{rd}$ Generation (3G) asynchronous mobile communication system operating in Wideband Code Division Multiple Access (WCDMA), evolved from European mobile communication systems, Global System for Mobile communications (GSM) and General Packet Radio Services (GPRS).

Long Term Evolution (LTE) is presently being considered a future-generation UMTS mobile communication system in the $3^{rd}$ Generation Partnership Project (3GPP) working on the standardization of UMTS. LTE is a technology for realizing high-speed packet communications at or above 100 Mbps, aiming at deployment by 2010. To implement LTE, many techniques have been proposed, including reduction of the number of nodes residing on a communication path through simplification of a network configuration, and approximation of radio protocols as close to radio channels as possible.

FIG. 1 illustrates a configuration of an LTE mobile communication system.

Referring to FIG. 1, Evolved UMTS Radio Access Networks (E-RANs) 110 and 112 are of a simple 2-node structure including Evolved Node Bs (ENBs or Node Bs) 120, 122, 124, 126 and 128 and anchor nodes 130 and 132. A User Equipment (UE) 101 accesses an Internet Protocol (IP) network 114 via the E-RAN 110 or 112.

The ENBs 120, 122, 124, 126 and 128 correspond to conventional Node Bs of a UMTS system. They are connected wirelessly to the UE 101. Unlike the conventional Node Bs, the ENBs 120, 122, 124, 126 and 128 are complex in function. In the LTE system, all user traffic including real-time services like Voice over IP (VoIP) is serviced on a shared channel. Therefore, there is a need for an apparatus for collecting status information about UEs and scheduling them. The ENBs 120, 122, 124, 126 and 128 function as this apparatus.

As with High Speed Downlink Packet Access (HSDPA) or Enhanced uplink Dedicated CHannel (E-DCH), Hybrid Automatic Repeat reQuest (HARQ) is carried out between the ENBs 120, 122, 124, 126 and 128 and the UE 101. Yet, since a variety of Quality of Service (QoS) requirements are not satisfied simply with HARQ, an upper layer may perform an outer Automatic Repeat reQuest (ARQ). The outer ARQ also takes place between the UE 101 and the ENBs 120, 122, 124, 126 and 128.

To realize data rates of up to 100 Mbps, it is expected that Orthogonal Frequency Division Multiplexing (OFDM) with a bandwidth of 20 MHz will be used as a wireless access technology for LTE. Adaptive Modulation and Coding (AMC) will also be adopted, in which a modulation scheme and a channel-coding rate are decided adaptively according to the channel status of a UE.

Many future-generation mobile communication systems including LTE use both HARQ and ARQ as error correction techniques.

HARQ increases a reception success rate by soft-combining previous received data with retransmitted data without discarding the previous received data. Specifically, an HARQ receiver determines whether a received packet has errors. Depending on the presence or absence of errors, the HARQ receiver transmits a positive ACKnowledgment (HARQ ACK) signal or a Negative ACK (HARQ NACK) signal to an HARQ transmitter. The HARQ transmitter retransmits the HARQ packet when receiving the HARQ NACK signal and transmits a new packet when receiving the HARQ ACK signal. The HARQ receiver soft-combines the retransmitted packet with the previously received packet, thus decreasing an error probability.

ARQ is a scheme in which the receiver checks the Sequence Number (SN) of a received packet and requests retransmission of a packet that it has failed to receive. Compared to HARQ, ARQ does not soft-combine a previously received packet with a retransmitted packet.

In the LTE system, ARQ is performed by a Radio Link Control (RLC) protocol, i.e. an L2 protocol, whereas HARQ takes place in the Medium Access Control (MAC) layer or the physical layer. If RLC Protocol Data Units (PDUs) received from a MAC entity do not include RLC control information, an RLC reception (Rx) entity re-orders the RLC PDUs and performs a subsequent operation. If the RLC PDUs include RLC control information, the RLC Rx entity needs to process them efficiently. Accordingly, there exists a need for a technique for efficiently processing control information included in PDUs in a specific protocol layer such as the RLC layer.

SUMMARY OF THE INVENTION

The present invention has been made to address at least the above problems and/or disadvantages and to provide at least the advantages described below. Accordingly, an aspect of the present invention provides a method and apparatus for efficiently processing control information included in PDUs in a mobile communication system.

According to one aspect of the present invention, a method for processing control information included in a data unit in a mobile communication system is provided. The control information of a first type is processed immediately irrespective of reordering of a received data unit, when the received data unit comprises the control information of the first type. The control information of a second type is processed after reordering of the received data unit, when the received data unit comprises the control information of the second type.

According to another aspect of the present invention, an apparatus for processing control information included in a data unit in a mobile communication system is provided. When the received data unit comprises control information of the first type, a control information demultiplexer outputs immediately control information of a first type irrespective of reordering of a received data unit. When the received data unit comprises control information of the second type, the control information demultiplexer outputs control information of a second type after reordering of the received data unit. A reception buffer buffers data units received from the control information demultiplexer until the data units are reordered, and outputs control information of the second type, when there is a reordered data unit comprising control information of the second type among the buffered data units. A controller for processing at least one of pieces of control information received from the control information demultiplexer and the reception buffer.

According to a further aspect of the present invention, a method for processing control information included in a data unit in a mobile communication system is provided. A control data unit comprising only control information is received and generation of a status report is triggered at a time indicated by time information set in a poll, when the control data unit comprises the poll commanding transmission of the status report about reception status of data units.

According to yet another aspect of the present invention, an apparatus for processing control information included in a data unit in a mobile communication system is provided. A poll generator generates a poll commanding transmission of a status report about reception status of data units and comprising time information in the poll, the time information indicating a time when generation of the status report is to be triggered. A data generator generates a control data unit comprising the poll and transmitting the control data unit.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF PREFERRED EMBODIMENTS

Figure 1:
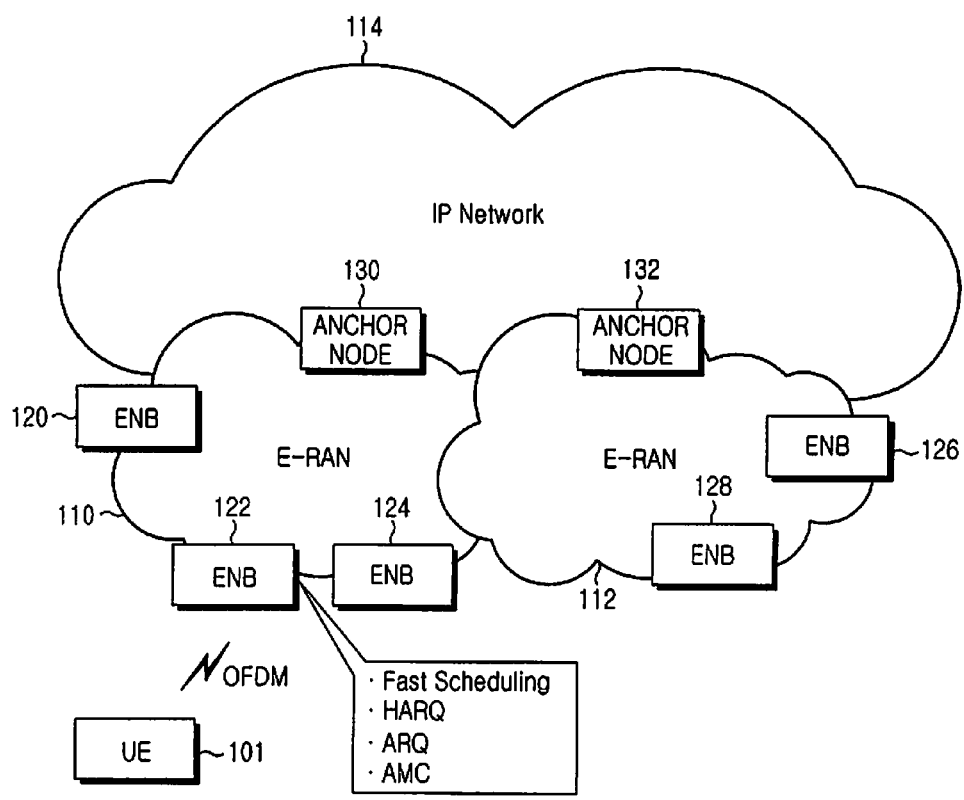
FIG. 1 is a diagram illustrating a configuration of an LTE mobile communication system.

Preferred embodiments of the present invention are described in detail with reference to the accompanying drawings. It should be noted that the similar components are designated by similar reference numerals although they are illustrated in different drawings. Detailed descriptions of constructions or processes known in the art may be omitted to avoid obscuring the subject matter of the present invention.

Embodiments of the present invention provide a technique for efficiently processing control information included in PDUs that have not been re-ordered completely in a particular protocol layer.

While the present invention is described in the context of an LTE system evolved from an asynchronous WCDMA system called UMTS, it is obvious to those skilled in the art that the present invention is also applicable to other mobile communication systems.

Figure 2:
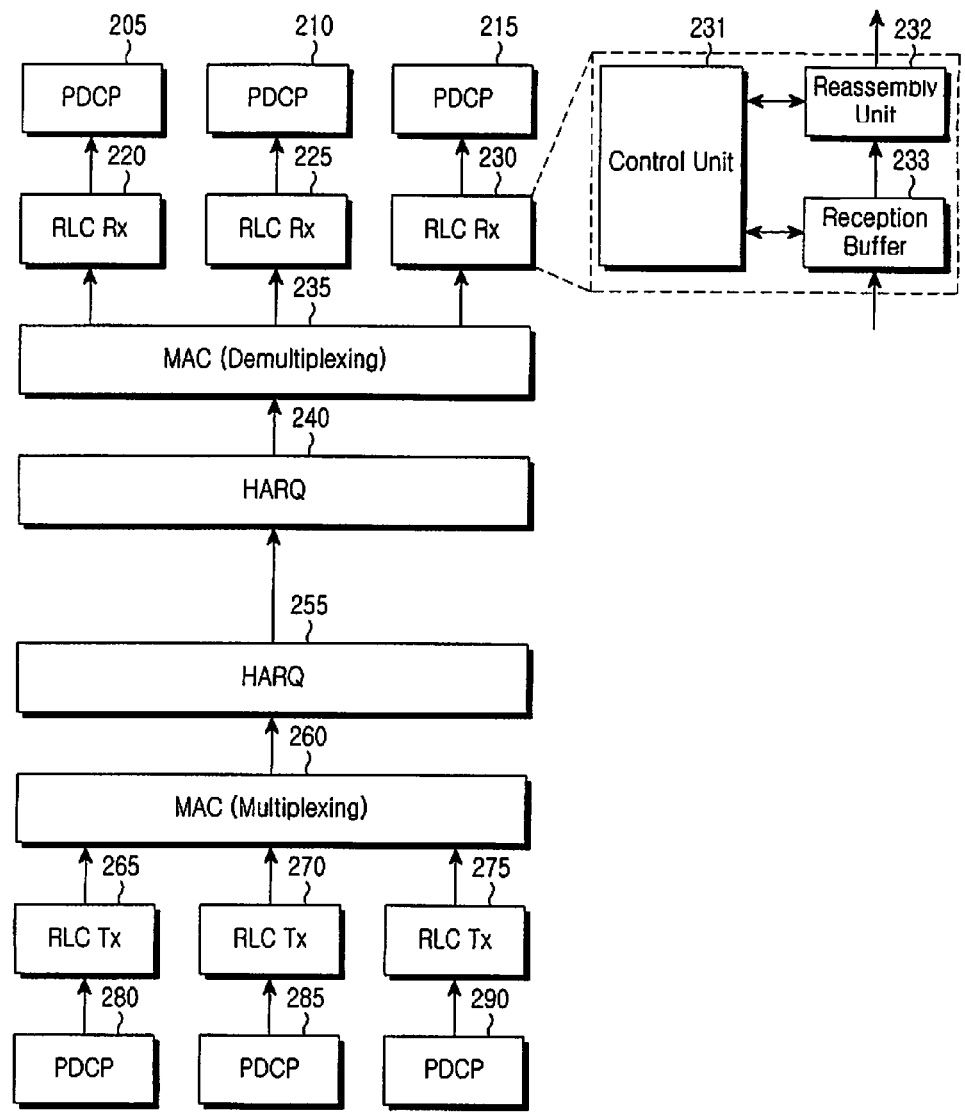
FIG. 2 is a diagram illustrating a protocol stack in the LTE mobile communication system.

FIG. 2 illustrates a protocol stack in an LTE mobile communication system. A transmitter and a receiver have symmetrical protocols. For downlink communications based on the illustrated protocol stack, the transmitter and the receiver correspond to an ENB and a UE, respectively. For uplink communications based on the illustrated protocol stack, the transmitter and the receiver correspond to a UE and an ENB, respectively.

Referring to FIG. 2, Packet Data Convergence Protocol (PDCP) entities 205, 210, 215, 280, 285 and 290 and RLC entities 220, 225, 230, 265, 270 and 275 are configured in a one-to-one correspondence to services. The PDCP layer takes charge of IP header compression/decompression, whereas the RLC layer reconfigures PDCP Packet Data Units (PDUs) to an appropriate size and performs ARC. A PDU refers to data output from a particular protocol entity. For example, a PDCP PDU is data from a PDCP entity.

MAC layers 235 and 260 are connected to the plurality of RLC entities 220, 225, 230, 265, 270 and 275 configured for one UE. They multiplex RLC PDUs to a MAC PDU and demultiplex a received MAC PDU into RLC PDUs.

HARQ layers 240 and 255 transmit and receive MAC PDUs by a predetermined HARQ operation.

Protocol entities exist in pairs in the transmitter and the receiver. For instance, RLC transmit (Tx) entities 265, 270 and 275 are matched to RLC Rx entities 220, 225 and 230 in a one-to-one relationship.

Each RLC entity includes a reception buffer 233 for buffering MAC PDUs received from the MAC layer 235, a reassembler 232 for reassembling the buffered MAC PDUs to an RLC PDU, and a controller 231 for controlling the operations of the reception buffer 233 and the reassembler 232.

Figure 3:
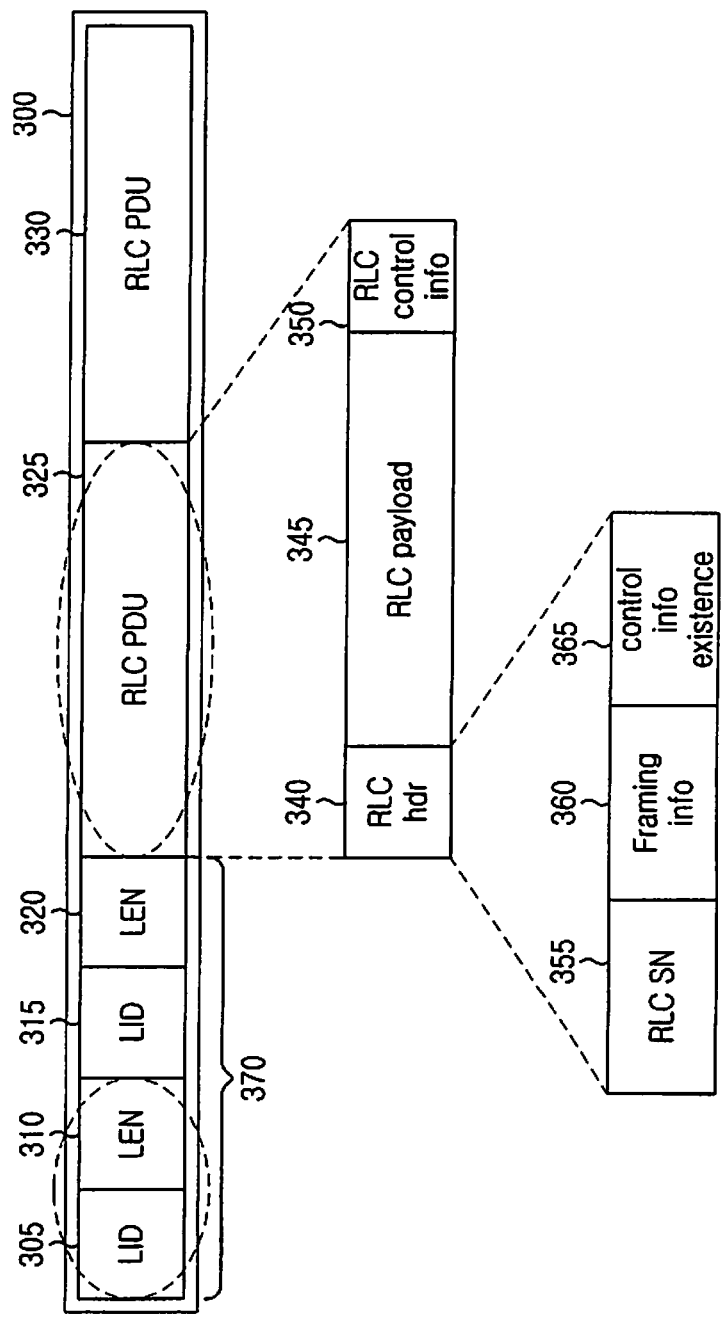
FIG. 3 is a diagram illustrating the formats of a MAC PDU and an RLC PDU.

FIG. 3 illustrates the formats of a MAC PDU and an RLC PDU.

Referring to FIG. 3, an RLC Tx entity creates RLC PDUs by reconfiguring PDCP PDUs received from a PDCP Tx entity. Each RLC PDU 325 includes an RLC header (hdr) 340, RLC payload 345, and RLC control information (info) 350. The RLC hdr 340 has an RLC SN 355 that increases monotonously by 1, Framing info 360 required for reassembling RLC PDUs to PDCP PDUs, and controls info existence 365 indicating whether RLC control info 350 is included in the RLC PDU 325. The RLC payload 345 includes all or part of a PDCP PDU.

The RLC control info 350 can be, for example, a status report indicating an RLC reception status, poll info commanding an RLC Rx entity of the other party to transmit a status report, or RESET commanding initialization of, for example, a protocol parameter and a timer. The RLC control info 350 is included in the RLC PDU 325, only when needed. The control info existence 365 indicates whether the RLC control info 350 is included. It can be further contemplated as another embodiment of the present invention that the RLC control info 350 is positioned at a different position, for instance, in or after the RLC hdr 340.

The RLC Tx entity transmits the RLC PDU 325 to a MAC Tx entity. The MAC Tx entity receives RLC PDUs 325 and 330 from a plurality of RLC Tx entities and inserts Logical channel Identifiers (LIDs) 305 and 315 and Lengths (LENs) 310 and 320 indicating the lengths of the RLC PDUs 325 and 330. Since one LID and one LEN are inserted for each RLC PDU, as many LIDs and as many LENs are inserted for RLC PDUs.

In general, a MAC header 370 resides at the start of a MAC PDU 300. Hence, the LIDs 305 and 315 and the LENs 310 and 320 are sequentially matched to the RLC PDUs 325 and 330 according to their positions within the MAC header 370. That is, the first LID 305 and LEN 310 in the MAC header 370 are about the first RLC PDU 325, and the second LID 315 and LEN 320 in the MAC header 370 are about the second RLC PDU 330.

The MAX Tx entity transmits the MAC PDU 300 to a MAC Rx entity by a predetermined HARQ operation.

The HARQ operation involves a permutation of the sequence of MAC PDUs because they are retransmitted a different number of times. For instance, if six HARQ retransmissions completes transmission of MAC PDU [x] and two HARQ retransmissions completes transmission of the next MAC PDU, MAC PDU [y], RLC PDUs included in MAC PDU [y] arrives at the RLC Rx entity earlier than those included in MAC PDU [y]. As a consequence, the sequence of the RLC PDUs is permuted.

Upon receipt of the MAC PDUs, the MAC Rx entity transmits the RLC PDUs extracted from the MAC PDUs to appropriate RLC Rx entities, referring to the MAC headers of the MAC PDUs.

With reference to FIG. 2, the operation of the RLC Rx entity will be described in more detail.

RLC PDUs received from the MAC layer 235 are buffered in the reception buffer 233. The reception buffer 233 reorders the RLC PDUs according to their SNs. If there is a gap among the SNs of the RLC PDUs, this implies that HARQ reception of a missing RLC PDU supposed to fill the gap is in progress or reception of the missing RLC PDU is failed at an HARQ level. To make sure that the missing RLC PDU is not in the process of HARQ reception, the reception buffer 233 waits a predetermined time. If the reception buffer 233 fails to receive the missing RLC PDU during the waiting time, it declares that the reception of the RLC PDU is failed and performs a necessary subsequent operation.

As described above, when an RLC PDU is missing, the RLC Rx entity waits until it makes sure that the missing RLC PDU is not in the process of HARQ reception. If the RLC Rx entity fails to receive the RLC PDU until the waiting time expires, it declares that the reception of the RLC PDU is failed. This process is referred to as reordering. The reception buffer 233 postpones processing non-reordered RLC PDUs until they are reordered. In other words, the reception buffer 233 determines whether the RLC PDUs can be assembled after they are reordered. If the assembly is possible, the reception buffer 233 provides the RLC PDUs to the reassembler 232.

The reassembler 232 reassembles the RLC PDUs to a PDCP PDU and provides the PDCP PDU to the PDCP entity 215.

The controller 231 performs control operations such as an ARQ operation. In the presence of a missing PDU even after the reordering, the controller 231 requests the RLC Tx entity 275 to retransmit the missing RLC PDU, or upon receipt of a reception status report command from the RLC Tx entity 275, it reports the status of reception up to the point. If reset is required for a protocol parameter or a timer for some reason, the controller 231 resets the protocol parameter or the timer.

As stated before, RLC control info of an RLC PDU may include the following:

RLC poll, status report
Moving Receiving Window (MRW), MRW ACK
RLC RESET, RLC RESET ACK The RLC Tx entity can command the RLC Rx entity to transmit a status report at a given time, for ARQ. The status report command is referred to as an RLC poll. The status report is control information including information about the reception status of the RLC Rx entity. That is, the status report includes the SNs of RLC PDUs successfully received so far and the SNs of RLC PDUs whose reception has been failed so far.

When the RLC Tx entity gives up transmission of an RLC PDU, it notifies the RLC Rx entity accordingly by the MRW. For instance, if the RLC Tx entity quits transmission of an RLC with SN x, RLC [x], it transmits an MRW with x to the RLC Rx entity. Upon receipt of the MRW, the RLC Rx entity does not request retransmission of RLC PDU [x], as if it had already received RLC PDU [x]. After the RLC Rx entity moves a reception window beyond x, it transmits an MRW ACK to the RLC Tx entity, thus notifying of completion of the control operation.

For ARQ, control information, a variable, and a timer are required. When needed, they can be reset to their initial values. To do so, the RLC Tx entity transmits control information, an RLC RESET. The RLC Rx entity resets the control information, the variable, and the timer and transmits an RLC RESET ACK to the RLC Tx entity.

It is preferred to process some RLC control information as fast as possible irrespective of reordering. It is also preferred to process other RLC control information such as an RLC poll commanding a status report after the reordering.

Figure 4:
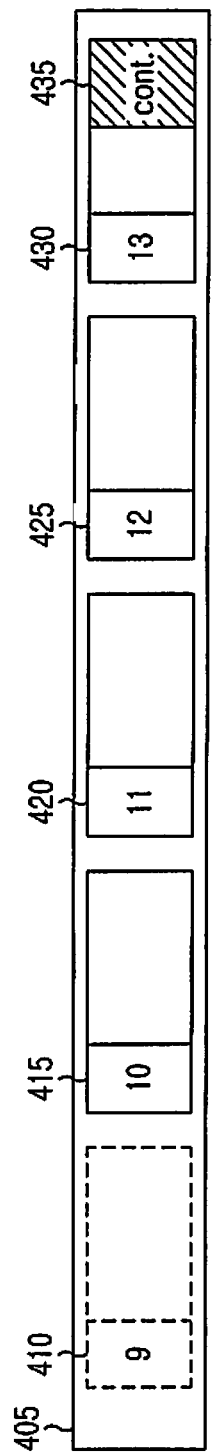
FIG. 4 is a diagram illustrating an operation for processing L2 control information in a reception buffer.

FIG. 4 illustrates an operation for processing L2 control information in the reception buffer.

Referring to FIG. 4, an RLC reception buffer 405 buffers RLC PDU [10] 415, RLC PDU [11] 420, RLC PDU [12] 425 and RLC PDU [13] 430. RLC PDU [9] 410 has not been received yet and it is not sure whether RLC PDU [9] 410 is in the process of HARQ reception or the HARQ reception of RLC PDU [9] 410 has been failed. Under this situation, it is considered that RLC PDU [10] 415 to RLC PDU [13] 430 are not reordered. Non-reordered RLC PDUs can be defined by the system or a standard.

RLC PDU [13] 430 includes RLC control info 435. If the RLC control info 435 is an RLC RESET, it is preferred to process the RLC control info 435 as fast as possible irrespective of reordering. If the RLC control info 435 is an RLC poll, it is preferred to make a status report after the reordering of RLC PDUs including up to RLC PDU [13] 430.

Typically, the RLC Tx entity takes an RLC poll, when transmitting the last RLC PDU associated with one PDCP PDU in order to receive a report of the reception status of all RLC PDUs including the last RLC PDU. In this case, the RLC Rx entity should transmit the status report after reordering the RLC PDU having the RLC poll.

When RLC control info is transmitted along with upper-layer data such as a PDCP PDU in an RLC PDU, it is determined whether the RLC PDU needs to be reordered according to the type of the RLC control info. If the RLC PDU needs to be reordered, the RLC control info is processed after the reordering.

RLC control info is classified into two types according to the attributes of the RLC control info.

Type 1: RLC control info to be processed immediately irrespective of reordering. For example, RESET, RESET ACK, MRW, and MRQ ACK are classified as Type 1.

Type 2: RLC control info to be processed after reordering. For example, RLC poll is classified as Type 2.

Upon receipt of an RLC PDU with RLC control info, the RLC Rx entity decides when to process the RLC control info, referring to the type of the RLC control info. If the RLC control info is Type 1, the RLC Rx entity processes the RLC control info immediately. If the RLC control info is Type 2, the RLC Rx entity processes the RLC control info after the RLC PDU with the RLC control info completely reordered. The RLC Rx entity can determine the type of RLC control info included in an RLC PDU by the format of the RLC control info.

Figure 5:
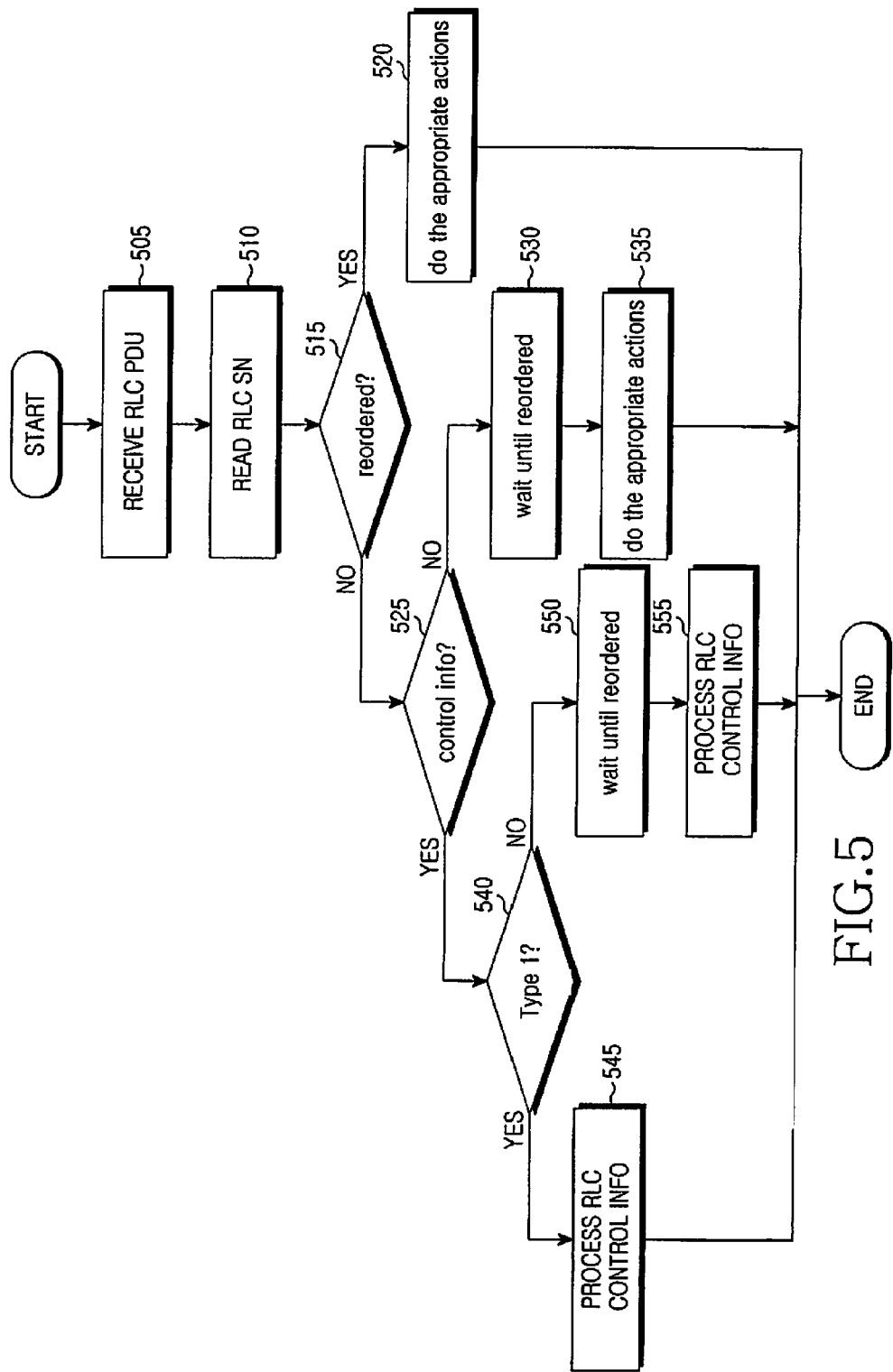
FIG. 5 is a flowchart illustrating a reception operation according to an embodiment of the present invention.

FIG. 5 is a flowchart of a reception operation in the RLC Rx entity according to an embodiment of the present invention.

Referring to FIG. 5, the RLC Rx entity receives an RLC PDU in step 505, reads the SN of the RLC PDU in step 510, and determines whether the RLC PDU has been reordered in step 515. If there are no missing RLC PDUs among RLC PDUs with lower SNs buffered in the reception buffer, it is said that the RLC PDU has been reordered. If there is a missing RLC PDU among RLC PDUs with lower SNs buffered in the reception buffer, it is said that the RLC PDU has not been reordered. A missing RLC PDU refers to an RLC PDU whose SN corresponds to a gap among the SNs of buffered RLC PDUs and which is probable to be in the process of HARQ reception. If the missing RLC PDU is not received until a predetermined time after detection of the mission RLC PDU, it is declared as a failed RLC PDU. The failed RLC PDU is an RLC PDU failed in HARQ reception and thus requiring retransmission in the RLC layer.

If the received RLC PDU has been reordered, a necessary subsequent operation is performed in step 520. That is, the RLC Rx entity provides RLC PDUs that can be assembled to a PDCP PDU among the buffered RLC PDUs to the reassembler 232, or provides RLC control info included in the RLC PDU to the RLC controller 231.

If the received RLC PDU remains to be reordered, the RLC Rx entity determines whether it includes RLC control info, referring to control info existence set in the RLC header of the received RLC PDU in step 525. In the absence of the RLC control info, the RLC Rx entity waits until the received RLC PDU is reordered in step 530 and performs the necessary subsequent operation on the RLC PDU in step 535.

In the presence of the RLC control information, the RLC Rx entity determines the type of the RLC control info in step 540. If the RLC control info is Type 1, such as an RLC RESET, an RLC RESET ACK, or a status report in step 540, the RLC Rx entity processes the RLC control info immediately and performs a necessary subsequent operation, even though the RLC PDU is not reordered in step 545. For example, if the RLC control info is an RLC RESET, the RLC Rx entity initializes an RLC protocol parameter, a timer, and a variable and transmits an RLC RESET ACK to the RLC Tx entity. The other part of the RLC PDU except the RLC control info remains in the reception buffer until the RLC PDU is reordered.

If the RLC control info is Type 2 in step 540, the RLC Rx entity waits until the RLC PDU with the RLC control info is completely reordered in step 550. When the RLC PDU is reordered, the RLC Rx entity processes the RLC control info in step 555. For example, if the RLC control information is an RLC poll, the RLC Rx entity makes an RLC status report indicating the reception status of RLC PDUs up to the point and transmits it to the RLC Tx entity.

Figure 6:
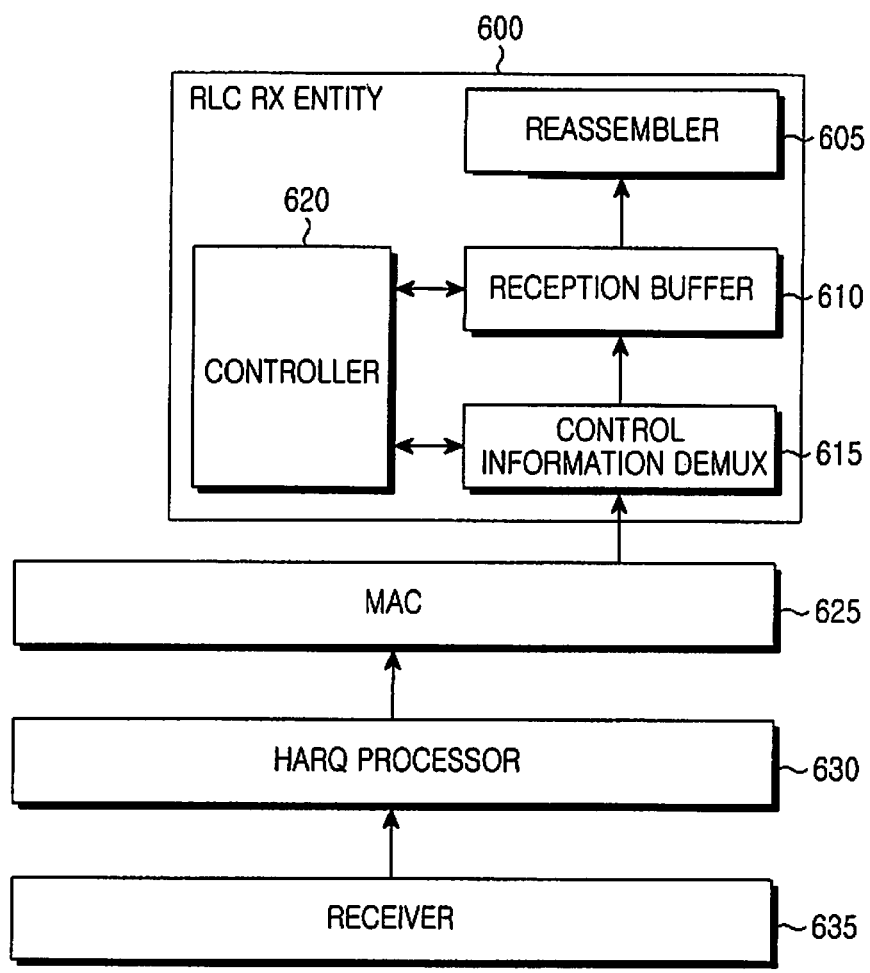
FIG. 6 is a block diagram illustrating a receiving apparatus according to an embodiment of the present invention.

FIG. 6 is a block diagram of a receiving apparatus according to an embodiment of the present invention. The receiving apparatus includes a receiver 635, an HARQ processor 630, a MAC layer device 625, a control information Demultiplexer (DEMUX) 615, a reception buffer 610, a reassembler 605, and a controller 620.

Referring to FIG. 6, the receiver 635 and the HARQ processor 630 recover a received radio signal to a MAC PDU and provides a successfully recovered MAC PDU to the MAC layer device 625. The MAC layer device 625 demultiplexes the MAC PDU into RLC PDUs by interpreting the header of the MAC PDU and provides them to an appropriate RLC Rx entity 600.

In the RLC Rx entity 600, if an RLC PDU received from the MAC layer device 625 includes RLC control info of Type 1, the control information DEMUX 615 provides the RLC control info to the controller 620. If the RLC PDU includes neither any RLC control info nor RLC control info Type 1, the control information DEMUX 615 provides the RLC PDU to the reception buffer 610.

The reception buffer 610 buffers RLC PDUs received from the control information DEMUX 615 and determines whether they have been reordered by reading their SNs. If there is any RLC PDU with RLC control info of Type 2 among the reordered RLC PDUs, the reception buffer 610 extracts the RLC control info of Type 2 and provides it to the controller 620.

The controller 620 interprets the RLC control info received from the control information DEMUX 615 and the reception buffer 610 and performs appropriate operations according to the interpretations. For example, if an RLC poll is received, the controller 620 makes a status report about the status of reception up to the point and transmits the status report to the RLC Tx entity.

The reassembler 605 reassembles reordered RLC PDUs that can be reassembled among the RLC PDUs buffered in the reception buffer 610 to an upper-layer data unit and provides the data unit to the upper layer (i.e. the PDCP layer).

When an RLC PDU carries only RLC control info, the RLC control info is processed irrespective of reordering of RLC PDUs carrying data.

For convenience' sake, RLC PDUs are categorized into RLC DATA PDUs and RLC CONTROL PDUs.

RLC DATA PDU: The RLC DATA PDU includes upper-layer data such as a PDCP PDU and is configured in the format illustrated in FIG. 3. The RLD Data unit can also include RLC control info.

RLC CONTROL PDU: the RLC CONTROL PDU includes only RLC control info. It is configured in a different format from the format of the RLC DATA PDU.

Figure 7:
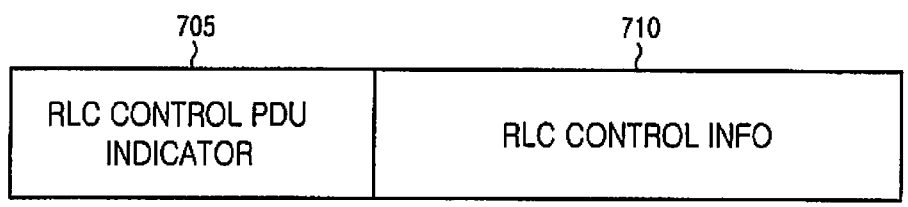
FIG. 7 is a diagram illustrating the format of an RLC CONTROL PDU according to an embodiment of the present invention.

FIG. 7 illustrates the format of an RLC CONTROL PDU according to an embodiment of the present invention.

Referring to FIG. 7, the RLC CONTROL PDU includes an RLC CONTROL PDU INDICATOR 705 and RLC CONTROL INFO 710. The RLC CONTROL PDU INDICATOR 705 identifies whether this RLC PDU is an RLC CONTROL PDU or an RLC DATA PDU. The RLC CONTROL PDU INDICATOR 705 can occupy a predetermined number of bits in an RLC header. If RLC control info is contained in separate MAC control information, the MAC layer can distinguish an RLC DATA PDU from an RLC CONTROL PDU. In this case, the RLC CONTROL PDU INDICATOR is not needed.

Since the RLC CONTROL PDU is not labeled with an SN, the concept of reordering is useless. As stated before, an RLC poll is transmitted when a reception status of RLC PDUs including the last RLC PDU is required. If an RLC CONTROL PDU carries an RLC poll, the RLC Rx entity has no knowledge of the SN of the last PDU and thus cannot determine RLC PDUs for which a status report is to be made.

In this embodiment of the present invention, when an RLC CONTROL PDU has an RLC poll, the RLC Rx entity waits until all RLC DATA PDUs buffered in the reception buffer at the time of receiving the RLC poll are reordered, and then makes a status report.

Figure 8:
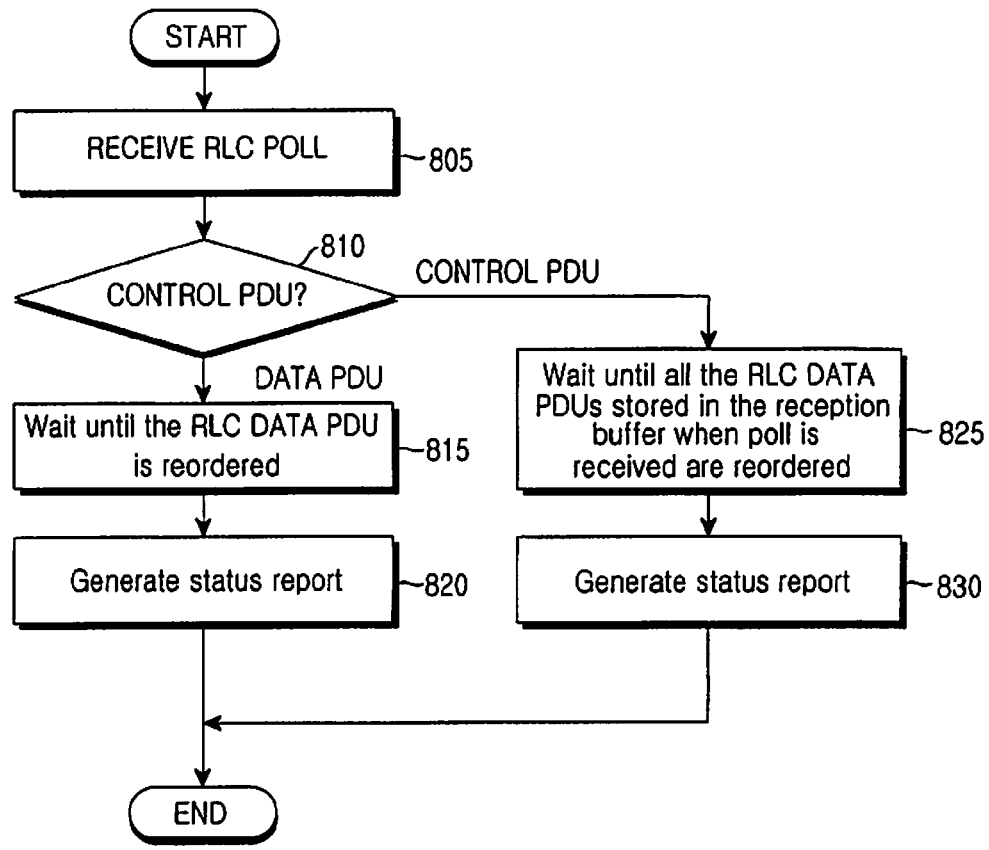
FIG. 8 is a flowchart illustrating a reception operation according to an embodiment of the present invention.

FIG. 8 is a flowchart of a reception operation in the RLC Rx entity according to an embodiment of the present invention.

Referring to FIG. 8, upon receipt of an RLC PDU including an RLC poll in step 805, the RLC Rx entity determines whether the RLC PDU is an RLC DATA PDU or an RLC CONTROL PDU in step 810. If the RLC poll is included in an RLC DATA PDU, the RLC Rx entity goes to step 815, and if the RLC poll is included in an RLC CONTROL PDU, the RLC Rx entity goes to step 825. The RLC Rx entity waits until the RLC DATA PDU is reordered in step 815 and then creates a status report or triggers a status report creation operation in step 820.

In step 825, the RLC Rx entity waits until RLC DATA PDUs buffered in the reception buffer up to the time of receiving the RLC CONTROL PDU are reordered. A status report is created or a status report creation operation is triggered in step 830.

A receiving apparatus according to this embodiment of the present invention is configured similarly to that illustrated in FIG. 6, except that the control information DEMUX 615 monitors reception of an RLC CONTROL PDU from the MAC layer device 625 and provides only RLC CONTROL PDUs among received RLC PDUs directly to the controller 620, and the controller 620 triggers a status report creation operation at an appropriate time. The appropriate time refers to the time point when all RLC DATA PDUs buffered in the reception buffer up to the time of receiving an RLC CONTROL PDU are reordered.

When an RLC poll is transmitted in an RLC CONTROL PDU, the RLC poll includes information about a time for creating a status report in the RLC Rx entity.

For instance, the RLC Tx entity includes an RLC SN indicating a time at which it wants the RLC Rx entity to create a statue report in the RLC CONTROL PDU. Alternatively, the RLC Tx entity includes explicit information indicating a time at which it wants the RLC Rx entity to create a statue report in the RLC CONTROL PDU.

Figure 9A:
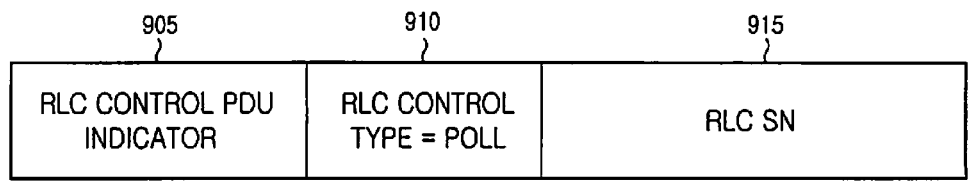
FIGS. 9A and 9B are diagrams illustrating the formats of RLC CONTROL PDUs each having an RLC poll according to an embodiment of the present invention.
Figure 9B:
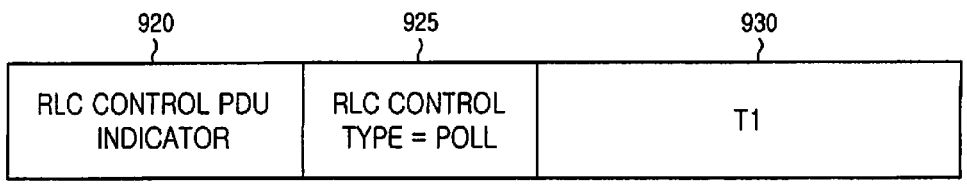

FIGS. 9A and 9B illustrate the formats of RLC CONTROL PDUs each having an RLC poll according to an embodiment of the present invention. Each of the RLC CONTROL PDUs includes an RLC CONTROL PDU INDICATOR 905 or 920 and an RLC poll 910 and 915 or 925 and 930.

Referring to FIG. 9A, when the RLC CONTROL PDU includes a RLC SN, the RLC poll includes an RLC CONTROL TYPE 910 and an RLC SN 915. The RLC SN 915 is used to request the RLC Rx entity to transmit a status report after reordering up to an RLC DATA PDU corresponding to the RLC SN 915. That is, when the RLC Tx entity wants to monitor the transmission status of up to the RLC DATA PDU with the RLC SN, it includes the RLC SN in the RLC poll.

Referring to FIG. 9B, when a time at which the RLC Rx entity is supposed to generate a status report is explicitly indicated, the RLC poll includes a RLC CONTROL TYPE 925 and T1 930. T1 930 means that the RLC Rx entity is supposed to transmit a status report time T1 after receiving the RLC CONTROL PDU with the RLC poll.

Figure 10:
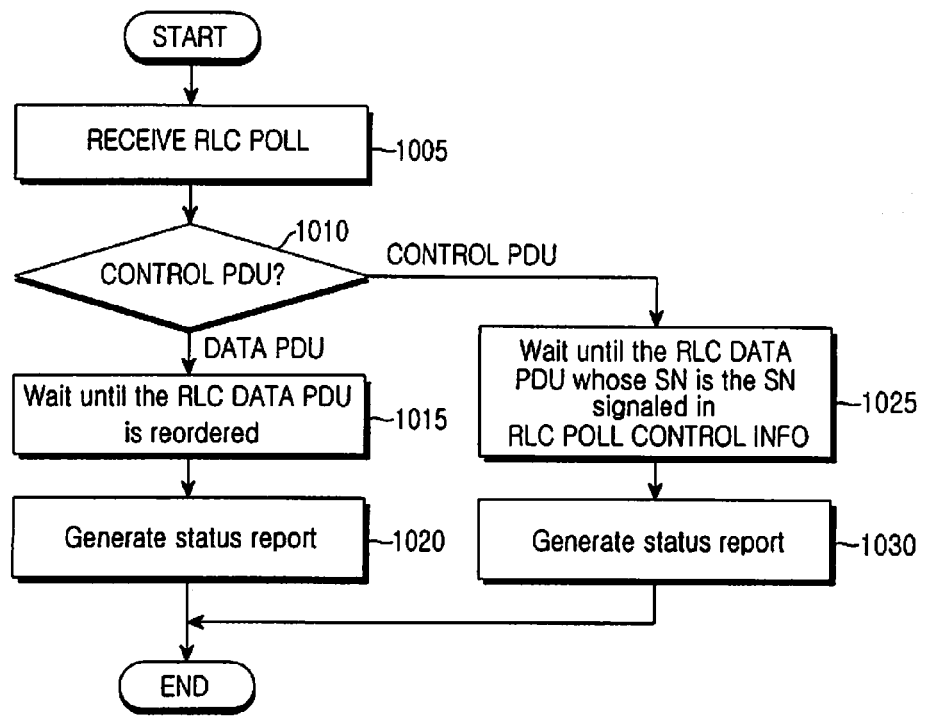
FIG. 10 is a flowchart illustrating a reception operation according to an embodiment of the present invention.

FIG. 10 is a flowchart of a reception operation in the case where a time for the RLC Rx entity to generate a status report is indicated by an RLC SN according to an embodiment of the present invention.

Referring to FIG. 10, upon receipt of an RLC poll in step 1005, the RLC Rx entity determines whether the RLC poll is included in an RLC DATA PDU or an RLC CONTROL PDU in step 1010. If the RLC poll is included in an RLC DATA PDU, the RLC Rx entity goes to step 1015 and if the RLC poll is included in an RLC CONTROL PDU, the RLC Rx entity goes to step 1020. Steps 1015 and 1020 are performed in the same manner as steps 815 and 820 illustrated in FIG. 8.

In step 1025, the RLC Rx entity waits until an RLC DATA PDU corresponding to the RLC SN included in the RLC poll is reordered and then goes to step 1030. If the RLC DATA PDU corresponding to the RLC SN has already been reordered at the time of receiving the RLC poll, the RLC Rx entity directly proceeds to step 1030. If the RLC DATA PDU corresponding to the RLC SN has not been received by the time of receiving the RLC poll, the RLC Rx entity activates a predetermined timer. If the RLC DATA PDU corresponding to the RLC SN has not been received or reordered until the timer expires, the RLC Rx entity goes to step 1030 upon expiration of the timer.

In step 1030, the RLC Rx entity creates a status report or triggers a status report creation operation.

Figure 11:
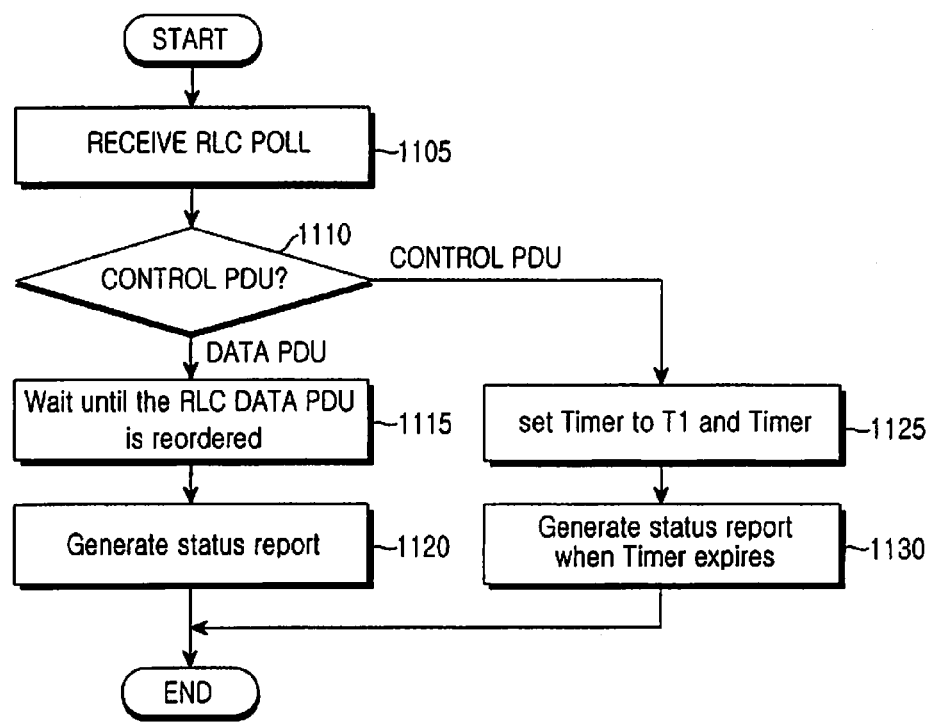
FIG. 11 is a flowchart illustrating another reception operation according to an embodiment of the present invention.

FIG. 11 is a flowchart of another reception operation in the case where a time for the RLC Rx entity to generate a status report is indicated by T1 according to an embodiment of the present invention.

Referring to FIG. 11, upon receipt of an RLC poll in step 1105, the RLC Rx entity determines whether the RLC poll is included in an RLC DATA PDU or an RLC CONTROL PDU in step 1110. If the RLC poll is included in an RLC DATA PDU, the RLC Rx entity goes to step 1115 and if the RLC poll is included in an RLC CONTROL PDU, the RLC Rx entity goes to step 1125. Steps 1115 and 1120 are performed in the same manner as steps 815 and 820 illustrated in FIG. 8.

In step 1125, the RLC Rx entity activates a timer set to T1 included in the RLC poll. When the timer expires, the RLC Rx entity creates a status report or triggers a status report creation operation in step 1130.

A receiving apparatus according to this embodiment of the present invention is configured similarly to that illustrated in FIG. 6, except that the control information DEMUX 615 monitors reception of an RLC CONTROL PDU from the MAC layer device 625 and provides only RLC CONTROL PDUs among received RLC PDUs directly to the controller 620, and the controller 620 performs a necessary operation by processing the RLC CONTROL PDU. If the RLC CONTROL PDU includes an RLC poll, the controller 620 triggers a status report creation operation at an appropriate time. The appropriate time refers to the time point when an RLC DATA PDU corresponding to an RLC SN set in the RLC poll is reordered, or at the time when a timer set to T1 included in the RLC poll expires.

In accordance with this embodiment of the present invention, the RLC Tx entity generates an RLC poll generator for generating an RLC poll including an RLC SN or T1 and a data generator for generating and transmitting an RLC PDU with the RLC poll.

As is apparent from the above description, the present invention advantageously prevents the delay of an RLC-layer control operation and thus improves communication quality by fast processing control information included in PDUs that have not been completely reordered. Furthermore, since control information whose processing is preferable after reordering is processed after the reordering, the present invention prevents malfunction.

While the invention has been shown and described with reference to certain preferred embodiments thereof, it will be understood by those skilled in the art that various changes in form and details may be made therein without departing from the spirit and scope of the present invention as defined by the appended claims and their equivalents.

What is claimed is:

1. A method for executing an operation, by a receiver, based on a type of control information included in a data unit in a mobile communication system, the method comprising:
   receiving a data unit including first type control information or second type control information;
   identifying the type of control information of the received data unit;
   executing a first operation without reordering of the received data unit, if the first type control information is received; and
   executing a second operation after reordering of the received data unit, if the second type control information is received,
   wherein the second type control information comprises a polling to trigger a status report of a reception status of data units,
   wherein the data unit comprises information indicating that the first type control information or the second type control information is included in the data unit, and
   wherein executing the second operation comprises triggering generation of the status report at a time indicated by time information set in the poll after reordering of the received data unit.

2. The method of claim 1, wherein the time information set in the poll is a sequence number, and the triggering comprises triggering generation of the status report at a time when a data unit having the sequence number is reordered.

3. The method of claim 1, wherein the time information set in the poll is a value of a timer, and the triggering comprises starting the timer when receiving the second type control information comprising the poll and triggering generation of the status report when the timer is expired.

4. The method of claim 1, wherein the first type control information comprises a status report.

5. The method of claim 4, wherein executing the first operation comprises processing the status report comprised in the first type control information without reordering of the received data unit.

6. An apparatus for executing an operation, based on a type of control information included in a data unit in a receiver of a mobile communication system, comprising:
   a receiver for receiving a data unit including first type control information or second type control information; and
   a controller for identifying the type of control information of the received data unit, executing a first operation without reordering of the received data unit, if the first type control unit is received, and executing a second operation after reordering of the received data unit, if the second type control information is received,
   wherein the second type control information comprises a polling to trigger a status report of a reception status of data units,
   wherein the data unit comprises information indicating that the first type control information or the second type control information is included in the data unit, and
   wherein the controller triggers generation of the status report at a time indicated by time information set in the poll, if the second type control information is received.

7. The apparatus of claim 6, further comprising:
   a control information demultiplexer for providing the second type control information to the controller, if the second type control information is received; and
   a reception buffer for buffering data units received from the control information demultiplexer until the data units are reordered.

8. The apparatus of claim 6, wherein the time information set in the poll is a sequence number, and the controller triggers generation of the status report at a time when a data unit having the sequence number is reordered.

9. The apparatus of claim 6, wherein the time information set in the poll is a value of a timer, and the controller starts the timer when receiving the second type control information comprising the poll and triggers generation of the status report when the timer is expired.

10. The apparatus of claim 6, wherein the first type control information comprises a status report.

11. The apparatus of claim 10, wherein the controller processes the status report comprised in the first type control information without reordering of the received data unit, if the first type control information is received.

* * * * *